A. C. PRATT.
BEAD WIRE AND METHOD OF MAKING THE SAME.
APPLICATION FILED OCT. 22, 1921.
1,434,720.
Patented Nov. 7, 1922.
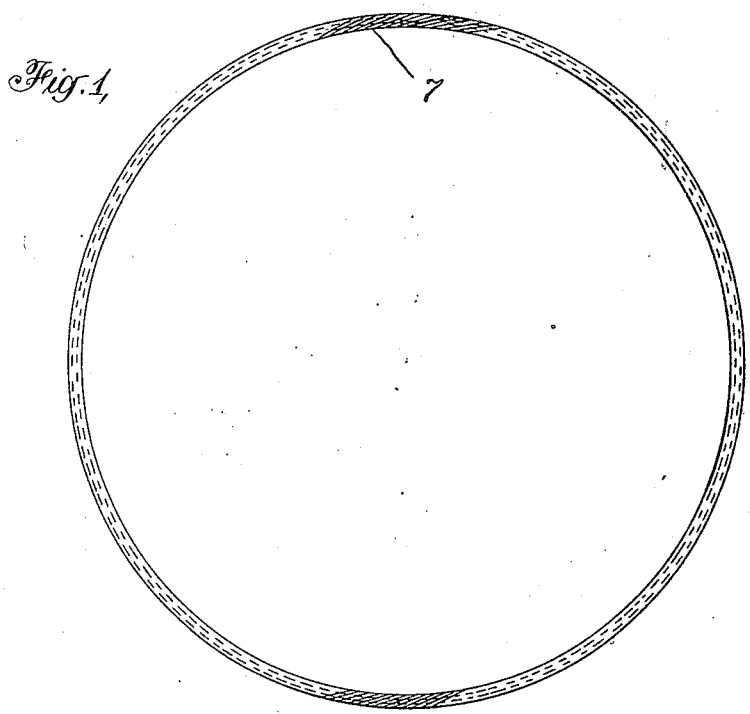
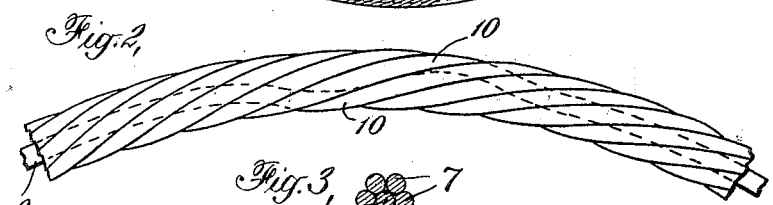
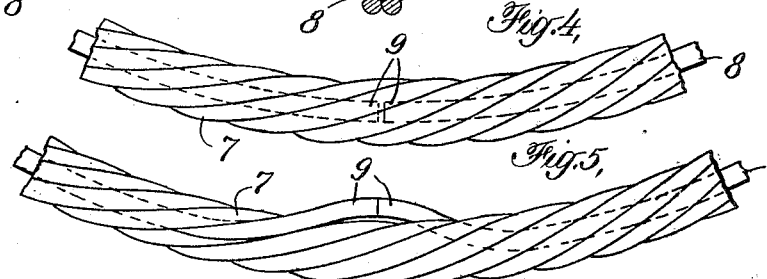
INVENTOR.
A. C. Pratt,
BY
ATTORNEYS.

Patented Nov. 7, 1922.

1,434,720

UNITED STATES PATENT OFFICE.

ALPHONSO COMSTOCK PRATT, OF DEEP RIVER, CONNECTICUT, ASSIGNOR TO INTERNATIONAL BEAD WIRE COMPANY, A CORPORATION OF DELAWARE.

BEAD WIRE AND METHOD OF MAKING THE SAME.

Application filed October 22, 1921. Serial No. 509,638.

*To all whom it may concern:*

Be it known that I, ALPHONSO COMSTOCK PRATT, a citizen of the United States, residing at Deep River, in the county of Middlesex, State of Connecticut, have invented certain new and useful Improvements in Bead Wires and Methods of Making the Same; and I do hereby declare the following to be a full, clear, and exact description of the invention, such as will enable others skilled in the art to which it appertains to make and use the same.

This invention relates to bead wires or grommets of a construction adapted for use in automobile tires, particularly those of the straight side type. Such a grommet or bead wire consists of a central core surrounded by a casing made up of a plurality of convolutions of wire, each convolution wound spirally upon the core. The present invention is of special utility in a bead wire in which the core and the surrounding casing of spirals are formed from a single length of wire, the ends of the length of wire forming the core and the intermediate portion of the length of wire forming the plurality of convolutions of spirals which constitute the casing. Bead wires of that construction may be made by employing the method and apparatus described in Letters Patent No. 1,294,160 granted to me February 11, 1919.

In the manufacture of bead wires for use in automobile tires, it is of great importance that all small irregularities incident to manufacture be eliminated and that the completed bead wires shall be accurately uniform in size. To this end it has become the practice to subject each of the bead wires to a severe expanding strain, as by placing it upon and subjecting it to the action of a standardized form of expanding machine. So expanding the bead wire results first in taking up any irregularities of manufacture, as for instance if there are points about the circumference of the bead wire where the spirals do not lie in firm contact with the core. After taking up these small irregularities the bead wire as a whole is enlarged in size a very small amount but still sufficient to bring it up to a standard diameter which is the diameter desired for all of the bead wires to be used in tires of a given size.

When a bead wire is subjected to such an expanding strain there is a tendency of the spirals to tighten upon the core and grip the core more firmly. Up to a certain point this gripping action of the spirals upon the core serves to preclude any slippage of the core within the casing of spirals. I have found, however, that if the bursting strain to which a bead wire is subjected becomes very large it may result in such slippage of the parts of the wire forming the core, these core parts sliding in the direction of their length within the casing of spirals so that the tensile strength of the wire itself is not effective to prevent enlargement of the bead wire. This possibility can, I find, be eliminated by so forming the core that the ends of the wire lying within the casing of spirals come very close together, or even overlap slightly, and then connecting these ends of the core parts together in any suitable manner as by welding them together. As a result, when the completed bead wire is subjected to an expanding strain, there can be no slippage of the core parts within the casing of spirals and no expansion of the bead wire resultant from such slippage and the full strength of the wire is effective in resisting expansion.

The ends of the core parts may be secured together in various ways but I find it most convenient to secure them together by welding. For this purpose, they may either abut or overlap, and if they overlap, their overlapping ends should be reduced in size so that the size of the bead wire will not be increased by the overlap of the core parts. In order to effect the weld, the ends of the core parts lying within the casing of spirals must be exposed to an extent sufficient to permit of making contact of the welding devices therewith. This may be done readily for adjacent spirals of the casing may be forced apart a substantial distance with a suitable tool. In this way, the ends of the core parts may be exposed to such extent as is necessary for coaction with the welding devices without removing them from their position within the casing. I prefer, however, to pry adjacent spirals of the casing apart and then bend the ends of the core parts enough to cause them to project out through this space provided in the casing of spirals. Then welding devices can be applied to the exposed ends of the core parts quite readily and the two ends may thus be welded together. After this has been done, the completed bead wire is placed upon an expanding machine and subjected to an expanding pressure to take up imperfections and effect accurate sizing and in this process of expansion any slack occasioned by forcing spirals of the casing apart and moving the ends of the core parts from their position for the purpose of effecting the weld is taken up.

The invention may be better understood by reference to the following description taken in connection with the accompanying drawings showing the preferred embodiment of the invention. In these drawings, Fig. 1 is a representation of a completed bead wire; Fig. 2 is an enlarged view of the portion of the bead wire known as the "cross-over", where the piece of wire from which the bead wire is made passes from the exterior casing to the interior core; Fig. 3 is a cross-sectional view of the bead wire; Fig. 4 is a view similar to Fig. 2 of another portion of the bead wire including the ends of the core parts; Fig. 5 is a view similar to Fig. 3 showing the ends of the core parts bent out slightly from their position within the casing of spirals; and Fig. 6 is a view similar to Fig. 3 showing the ends of the core parts welded together and restored to their position within the casing of spirals.

Referring to these drawings, the grommet or bead wire shown in Fig. 1 consists of a core and a casing of spirals surrounding the core and consisting of six convolutions of wire bent to a spiral form, the spirals of the six convolutions lying side by side about the core. This entire bead wire is made from a single length of wire, the ends of that single length forming the core and the intermediate portion the casing of spirals. Each end portion of the piece of wire forms substantially half of the core. In making this bead wire one of the core parts is first made and then the wire beyond that core part is given a spiral formation. Simultaneously with bending the wire to this spiral form the spirals are applied to their positions in the casing. Finally, after completing the convolutions of spirals a length of straight wire is provided beyond the spirals of the casing and adapted to form the other core part which with that originally formed constitutes the entire core. Preferably these two lengths of straight wire which together form the core are cut off with such accuracy that in the completed bead wire their ends will abut.

The cross-sectional construction of the completed bead wire is shown by Fig. 3 wherein 7 indicates the casing of spirals arranged side by side about the core 8. The ends of the core parts abutting each other are shown at 9 in Fig. 4. At a point in the completed bead wire substantially opposite the ends 9 is the crossover shown in Fig. 2. At this point the piece of wire from which the bead wire is formed passes out from each core part to the casing of spirals as is indicated at 10.

It will be seen that with a bead wire constructed as shown in Figs. 1 to 4 and having the ends 9 of the core parts close together but not connected one to the other, a severe expanding strain applied to the bead wire might result in slippage of the core parts through the casing, so that the ends of the core parts would no longer abut. In other words, the bead wire would be expanded in size without such expansion having been resisted by the full strength of the wire itself. To prevent this, I secure the ends of the core parts lying within the casing of spirals together by welding them together or connecting them together in any other suitable way. This results in the production of a bead wire formed from a piece of wire which is endless, a portion of this endless piece of wire constituting a core and another portion constituting a casing of encircling spirals. The securing together of the ends of the core parts may be effected in any suitable way but that which I prefer to employ is to pry apart two adjacent spirals of the casing at the point where the ends of the core parts lie, then bend the ends of the core parts slightly so that they project out through the space in the casing thus provided, then weld these projecting ends together and then restore the bent portion of the core to its position within the casing of spirals. This procedure is indicated in Fig. 5 where the ends 9 of the core parts are shown as projecting out through a space in the casing provided by forcing apart two adjacent spirals of the casing. The welding together of these ends of the core parts could be effected without bending the wire out from within the interior of the casing by forcing apart adjacent spirals of the casing an amount sufficient to permit of the introduction of welding devices but the procedure which I prefer is to bend the ends of the core parts out far enough to facilitate contact of the welding devices therewith. After the ends of the core parts have been so welded together, the bead wire is subjected to an expanding pressure to take up small irregularities incident to manufacture and to effect accurate sizing and this expanding operation serves to take up any slack incident to the spreading of spirals of the casing, the outward bending of the ends of the core parts and the welding operation.

In the drawings, the ends of the core parts are shown as cut off square and abutting but it will be apparent that these ends could be cut off at an acute angle or in some other shape whereby the ends of the core parts could be overlapped to facilitate welding.

A bead wire constructed in this manner possesses far greater strength to resist a bursting strain than one similarly constructed but not having the ends of the core parts joined together, for the reason that the welding together of the ends of the core parts eliminates the possibility of slippage of the core parts within the casing of spirals resulting in enlargement of the diameter of the bead wire which is not resisted by the tensile strength of the wire itself.

I claim:

1. A bead wire consisting of a core and a casing of spirals enclosing the core, the bead wire being formed from a single length of wire whose end portions form the core and whose intermediate portion forms the casing of spirals enclosing the core, the ends of the piece of wire forming the core and lying within the casing of spirals being secured together.

2. A bead wire consisting of a core and a casing of convolutions of spirals enclosing the core, the entire bead wire consisting of an endless piece of wire by reason of being formed from a single length of wire whose end portions constitute the core and whose intermediate portion constitutes the casing of spirals and having the ends of the core parts securely united.

3. The method of making a bead wire having a core and a casing of spirals surrounding the core, which consists in bending a single continuous piece of wire to form a core from the end portions thereof and to form convolutions of spirals enclosing the core from the intermediate portion thereof and welding together the ends of the piece of wire.

4. The method of making a bead wire having a core and a surrounding casing of spirals, which consists in bending a single continuous piece of wire to form parts of the core from the ends of the piece and to form convolutions of spirals from the portion of the wire intermediate its ends, then securing together the ends of the pieces of wire lying within the casing of spirals and then expanding the bead wire.

5. The method of making a bead wire having a core and a casing of spirals surrounding the core, which consists in bending a single piece of wire to form parts of the core from the ends thereof and to form a plurality of convolutions of spirals from the portion of the piece of wire intermediate its ends, then forcing apart portions of the casing overlying the ends of the piece of wire to expose those ends and then welding together the ends of the piece of wire.

6. The method of making a bead wire having a core and a casing of spirals surrounding the core, which consists in bending a single piece of wire to form parts of the core from the ends thereof and to form a plurality of convolutions of spirals from the portion of the piece of wire intermediate its ends, then bending the ends of the piece of wire laterally so that they project from the space within the casing of spirals, then welding together the said ends and then restoring the ends welded together to the interior of the casing of spirals.

7. The method of making a bead wire having a core and a casing of spirals surrounding the core, which consists in bending a single piece of wire to form parts of the core from the ends thereof and to form a plurality of convolutions of spirals from the portion of the piece of wire intermediate its ends, then forcing two adjacent spirals of the casing overlying the ends of the piece of wire apart, then bending the said ends laterally so that they project out from the space within the casing, then welding the said ends together and then expanding the bead wire.

In testimony whereof I affix my signature.

ALPHONSO COMSTOCK PRATT.